US007011110B1

(12) United States Patent
Stark

(10) Patent No.: US 7,011,110 B1
(45) Date of Patent: Mar. 14, 2006

(54) HIGH CAPACITY CO-AXIAL GAS VALVE

(75) Inventor: Mark H. Stark, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 98 days.

(21) Appl. No.: 10/747,543

(22) Filed: Dec. 29, 2003

(51) Int. Cl.
*F16K 1/54* (2006.01)
*F16K 31/06* (2006.01)

(52) U.S. Cl. .......................... 137/630.14; 137/630.22; 137/601.14

(58) Field of Classification Search ........... 137/599.16, 137/601.01, 601.14, 630.14, 630.15, 630.22; 251/129.19
See application file for complete search history.

(56) References Cited

U.S. PATENT DOCUMENTS

| | | | | | |
|---|---|---|---|---|---|
| 251,035 | A | * | 12/1881 | Freeman | 137/630.14 |
| 628,671 | A | * | 7/1899 | Newman | 137/630.14 |
| 1,457,937 | A | * | 6/1923 | Reynolds | 137/630.22 |
| 2,371,351 | A | * | 3/1945 | Paille | 137/601.14 |
| 2,392,741 | A | * | 1/1946 | Hurlburt | 137/630.22 |
| 3,727,836 | A | | 4/1973 | Visos et al. | 137/489 |
| 4,082,116 | A | * | 4/1978 | Stampfli | 137/630.14 |
| 4,760,694 | A | * | 8/1988 | Gillon, Jr. | 137/601.14 |
| 6,047,718 | A | | 4/2000 | Konsky et al. | 137/628 |

* cited by examiner

*Primary Examiner*—Stephen M. Hepperle
(74) *Attorney, Agent, or Firm*—Harness Dickey & Pierce PLC

(57) ABSTRACT

A high capacity coaxial gas valve assembly having a coaxial construction with three valves, in which the assembly opens a smaller second valve prior to opening a larger first valve so that the valve can be operated by a relatively smaller and less expensive coil. In addition, or instead, the valve members may be configured so that the first valve is opened with the impact of a moving element that allows the valve to be operated with a relatively smaller and less expensive coil.

9 Claims, 5 Drawing Sheets

HIGH CAPACITY CO-AXIAL GAS VALVE

BACKGROUND OF THE INVENTION

This invention relates to electromagnetically operated valves, and more particularly to a high capacity co-axial gas valve.

A solenoid valve having co-axial armatures in a single coil design is disclosed in Konsky et al., U.S. Pat. No. 6,047,718, incorporated herein by reference. This valve is provides redundant gas control with only a single solenoid, with a simple and reliable construction. However, for larger valve sizes, e.g., ⅝ inch and larger, larger and more expensive solenoids are generally required to overcome the gas pressure and open the valve.

SUMMARY OF THE INVENTION

The present invention provides a valve of simple an inexpensive construction with a larger size and therefore larger capacity, but which can be operated with a relatively small and inexpensive solenoid.

Generally, a first embodiment of a valve assembly constructed according to the principles of this invention comprises: an electrically energizable solenoid coil having a coil axis. An outer armature is mounted relative to the coil for axially movement proximally toward and distally away from the coil, parallel to the coil axis. An inner armature inside the outer armature, and is likewise axially movable proximally toward and distally away from the coil, parallel to the coil axis. At least the inner armature is drawn proximally when the solenoid coil is energized. The assembly comprises a first valve, having a first valve seat and a first valve member. The first valve member is movable between a closed position in which the first valve member abuts the first valve seat, and an open position in which the first valve member is spaced from the first valve seat. A first spring member resiliently biases the first valve member to its open position.

The assembly further comprises a second valve, having a second valve seat on the first valve member, and a second valve member on the outer armature. The second valve member is movable with the outer armature between a closed position in which the second valve member abuts the second valve seat, and an open position in which the second valve member is spaced from the second valve seat. A second spring member engages the outer armature and resiliently biases the second valve member carried thereon to its closed position.

The assembly further comprises a third valve, having a third valve seat and a third valve member on the inner armature. The third valve member is movable with the inner armature between a closed position in which the third valve member abuts the third valve seat, and an open position in which the third valve member is spaced from the third valve seat. A third spring member engages the inner armature and resiliently biases the third valve member carried thereon to its closed position.

Energizing the solenoid coil causes the inner armature to move proximally against the bias of the third spring member, moving the third valve member to its open position, the movement of the inner armature causing the outer armature to move proximally against the bias of the second spring member, moving the second valve member to its open position, and allowing the first valve member to move under bias of the first spring member to its open position. The opening of the smaller second valve reduces some of the gas pressure making it easier to open the larger first valve. In addition in some embodiments the outer armature engages the first member as it moves proximally, helping to open the first valve.

Generally, a second embodiment of a valve constructed according to the principles of this invention comprises: an electrically energizable solenoid coil having a coil axis. An outer armature is mounted relative to the coil for axially movement proximally toward and distally away from the coil, parallel to the coil axis. An inner armature inside the outer armature, and is likewise axially movable proximally toward and distally away from the coil, parallel to the coil axis. At least the inner armature is drawn proximally when the solenoid coil is energized. The assembly further comprises a first valve, having a first valve seat and a first valve member. The first valve member is movable between a closed position in which the first valve member abuts the first valve seat, and an open position in which the first valve member is spaced from the first valve seat. A first spring member resiliently biases the first valve member to its open position.

The valve assembly further comprises a flexible member sealingly connecting the outer armature and the first valve member to allow relative movement of the outer armature relative to the first valve member between a distal position and a proximal position. The outer armature has a flange and the first valve member has a shoulder which the flange engages when the outer armature is in its proximal position relative to the first valve member. A second spring member engaging the outer armature and resiliently biasing the outer armature to its distal position.

The assembly further comprises a second valve, having a second valve seat and a second valve member on the inner armature. The second valve member is movable with the inner armature between a closed position in which the second valve member abuts the second valve seat, and an open position in which the second valve member is spaced from the second valve seat. A third spring member engages the inner armature and resiliently biases the third valve member carried thereon to its closed position.

Energizing the solenoid coil causes the inner armature to move proximally against the bias of the third spring member, moving the second valve member to its open position, the movement of the inner armature causes the outer armature to move proximally against the bias of the second spring member so that the flange engages the shoulder on the first valve member to move the first valve member to its to its open position. In this embodiment the outer armature moves before engaging the first valve member, so that the impact of the moving outer armature helps to open the first valve. Further the inner armature is closer to its home position when it acts on the first valve member, exerting more force on the valve member to help open it.

Thus, coaxial valves of the present invention are of simple, inexpensive, yet reliable construction. These valves provide for the operating of large capacity valve with relatively smaller, less expensive solenoids. These and other features and advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF THE INVENTION

Without intending any loss of generality, the devices and methods of this invention will be described in conjunction with gas fuel control valves, inasmuch as the invention is considered particularly advantageous when employed in such devices. It will be recognized, however, that the devices and methods of this invention may be applied more generally to various other fluids, both gaseous and liquid, and may be used advantageously to control the flow of such fluids in devices other than those that are described herein. In addition, where the discussion refers to control of a current flowing in a coil, it will be recognized that control of either current or voltage may be possible, with equivalent results.

Figure 1:
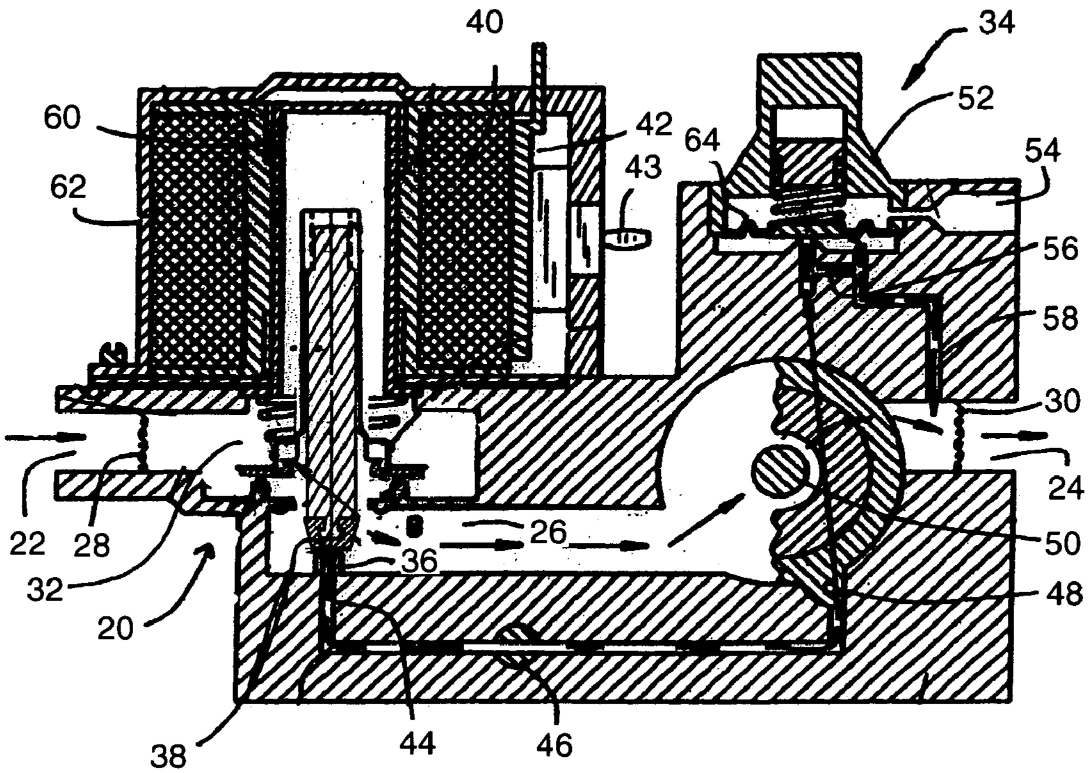
FIG. 1 is a cross-sectional view of a first embodiment of a gas valve constructed in accordance with the principles of this invention.

A first embodiment of a gas valve constructed according to the principles of this invention is indicated generally as 20 in FIG. 1. Gas valve 20 may be, for example a valve for controlling the flow of natural gas to an appliance, such as a furnace or water heater or the like. The gas valve 20 comprises an inlet 22, and an outlet 24, and a flow passage 26 therebetween. An inlet filter screen 28 and an outlet filter screen 30 can be provided to prevent debris from entering the valve. The gas valve 20 also comprises a valve assembly 32 (shown better in FIGS. 2–5), and a pressure regulator 34. A passage 36 having an opening 38 near the inlet 22 extends to the pressure regulator 34.

A control gas orifice 46, a diaphragm 48, a main regulator valve 50, a servo regulator 52, a regulator vent 54, a by-pass path 56, an outlet sense port 58. The construction and operation of the regulator is well known and is disclosed in Visos et al., U.S. Pat. No. 3,727,836, incorporated by reference in its entirety.

Gas enters at inlet 22 and passes through filter screen 28. When valve assembly 32 is open, gas flows through the redundant valve and is divided into two flows. One of these flows passes through the main/regulator valve 50, the filter screen 30, and outlet 24, and the other flow is directed through the main valve into opening 38, through passage 44, past the control gas orifice 46, and to the back of diaphragm 48, to servo regulator 52 and servo by-pass 56. The flows to servo regulator 52 and to servo by-pass 56 are then reunited at outlet sense port 58 and this second flow rejoins the first to pass through filter screen 30.

Figure 2:
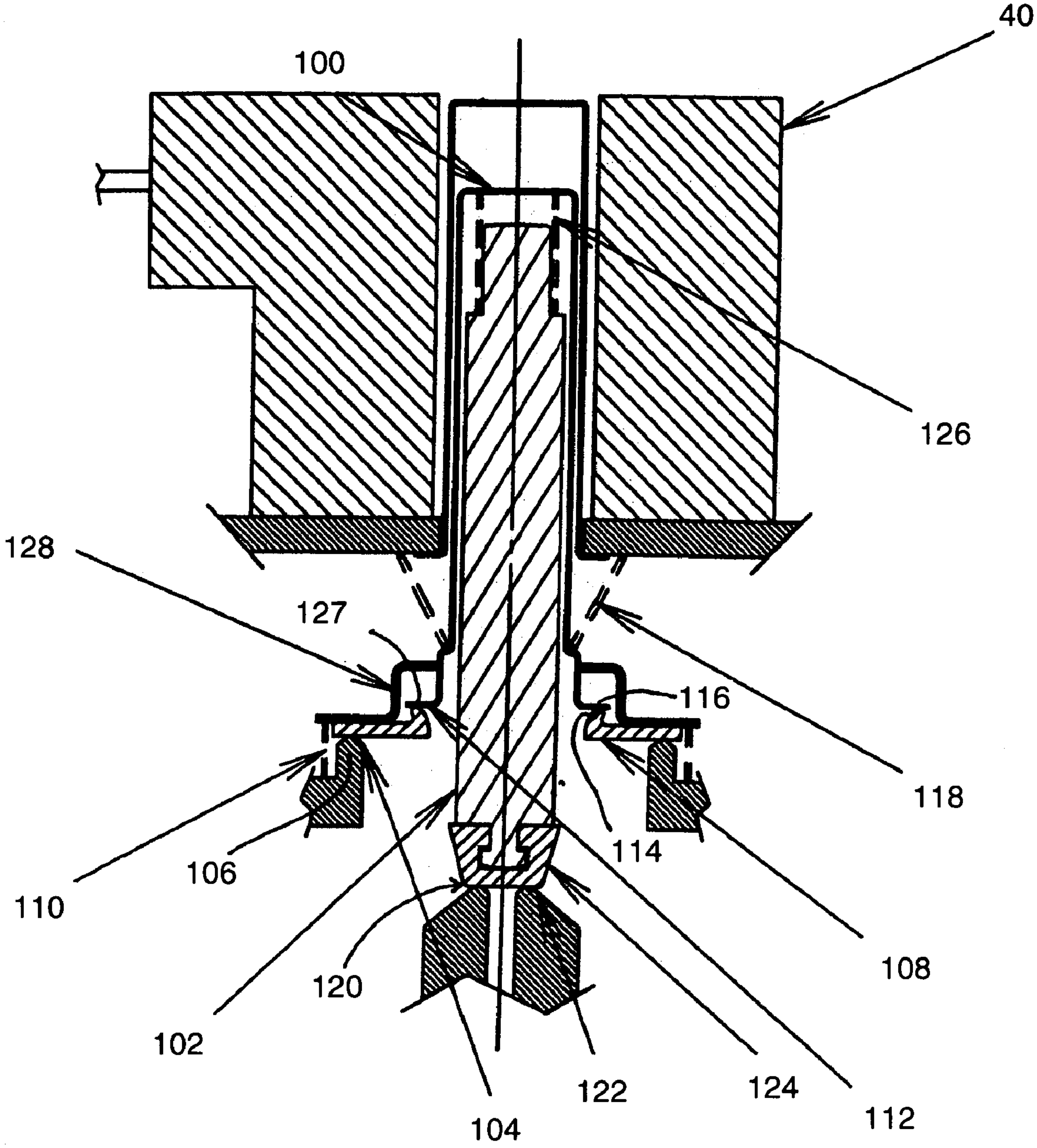
FIG. 2 is a enlarged cross-sectional view of the gas valve assembly of the first embodiment in the closed position.
Figure 3:
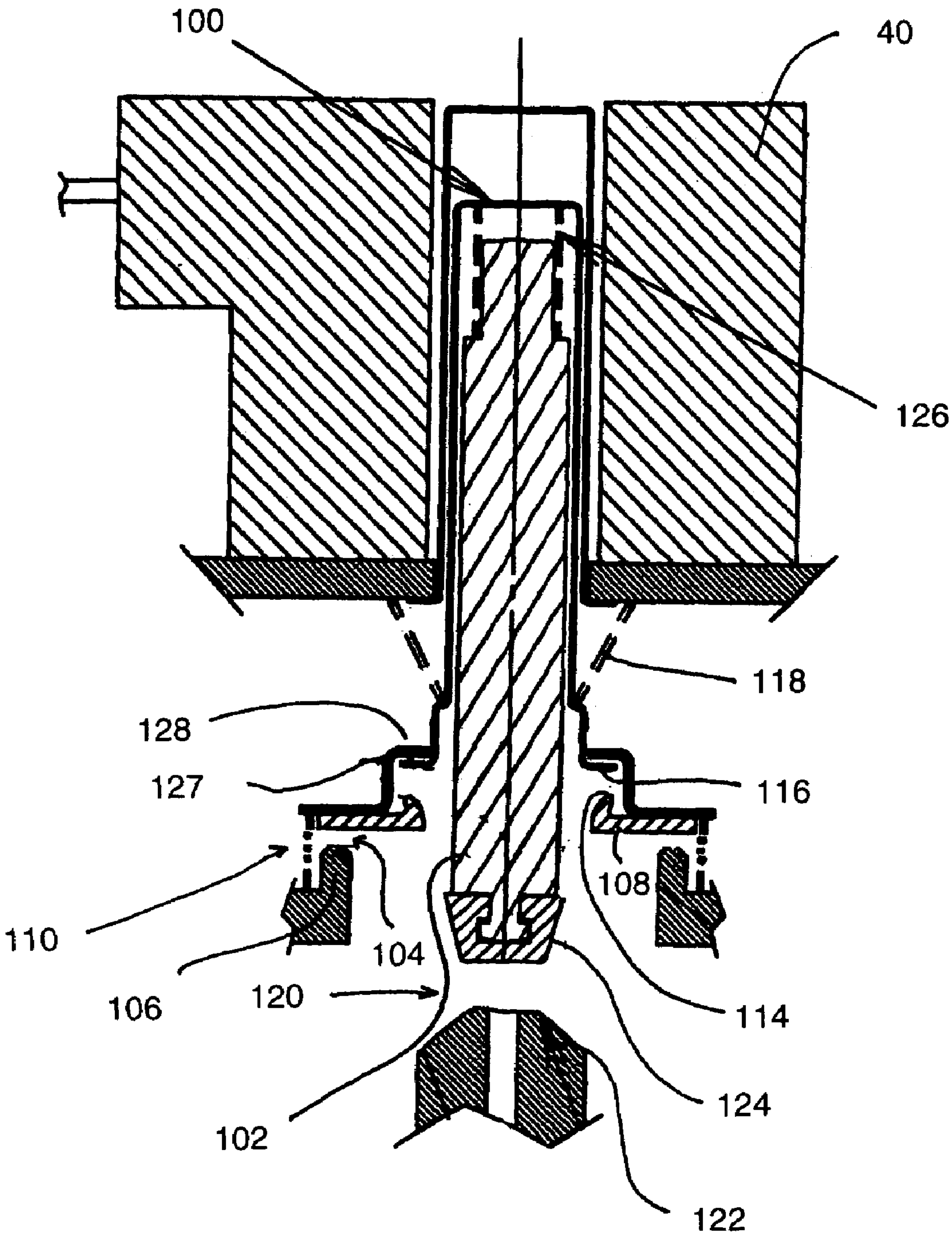
FIG. 3 is a enlarged cross-sectional view of the gas valve assembly of the first embodiment in the open position.

The gas valve assembly 32 is operated by a solenoid coil 40, having a generally central bore with a coil axis. A circuit board 42 may be provided to control the coil 40, and a switch 43 may be provided to manually operate the coil. As best shown in FIGS. 2 and 3, the gas valve assembly includes an outer armature 100 axially movable proximally toward and distally away from the coil 40, parallel to the coil axis. An inner armature 102 is disposed inside the outer armature 100, and is axially movable proximally toward and distally away from the coil 40, parallel to the coil axis. The inner armature 102 is made from or includes a magnetically responsive material such that it is drawn proximally when the solenoid coil 40 is energized.

The gas valve assembly 32 also includes a first valve 104, having a first valve seat 106, that may be formed in or secured on the body of the gas valve 20. The first valve 104 also includes a first valve member 108, which can move between a closed position (FIG. 2) in which the first valve member 108 abuts the first valve seat 106, and an open position (FIG. 3) in which the first valve member is spaced from the first valve seat. A first spring member resiliently biases the first valve member 108 to its open position. In this preferred embodiment the first spring member can be coil spring 110 surrounding the first valve seat 106 and acting between the first valve seat and the first valve member 108, although the spring member could be any other element capable of applying a force to separate the first valve seat and the first valve member.

The gas valve assembly 32 also includes a second valve 112, having a second valve seat 114 on the first valve member 108, and a second valve member 116 formed on the outer armature 100. The second valve member 116 is movable with the outer armature 100 between a closed position in which the second valve member abuts the second valve seat 114, and an open position in which the second valve member is spaced from the second valve seat. A second spring member engages the outer armature 100 and resiliently biases the second valve member 116 carried thereon to its closed position. In this preferred embodiment, the second spring member is a coil spring 118 which engages the outer armature and resiliently biases it in the distal direction.

The valve assembly 32 further comprises a third valve 120, having a third valve seat 122 and a third valve member 124 on the inner armature 102. The third valve member 124 is movable with the inner armature 102 between a closed position in which the third valve member abuts the third valve seat 120, and an open position in which the third valve member is spaced from the third valve seat. A third spring member engages the inner armature 102 and resiliently biases the third valve member carried thereon to its closed position. The third spring member may be a coil spring 126, or any suitable member for biasing the inner armature 102 in the distal direction.

Energizing the solenoid coil 40 causes the inner armature 102 to move proximally against the bias of the third spring member (e.g., spring 126), moving the third valve member 124 to its open position. This opens the passage 44. The movement of the inner armature 102 causes the outer armature 100 to move proximally against the bias of the second spring member (e.g., spring 118), moving the second valve member 116 to its open position. Once the second valve member 116 is in its open position, at least some of the gas pressure is relieved and the first valve member 108 can move under bias of the first spring member (e.g., spring 110), to its open position.

The first spring member may be sufficient to open the first valve 104, however, in stead of, or in addition to the force from the first spring member, the outer armature 100 can have a flange 127 (which may also serve as the part of the second valve member 116), which can engage a shoulder 128 formed on the second valve member to apply an opening force to the first valve member. The shoulder 128 is preferably spaced from the normal seated position of the flange 127, so that when the flange engages the shoulder, the flange is moving with the outer armature 100. This impact force contributes to the ability of the armature 100 to open the relatively larger first valve member 108. Further contributing to the ability of the armature to move the valve member is the fact that by the time the armature engages the first valve member, the armature has moved proximally into the bore of the coil where the pulling force of the coil is greater. Thus, by utilizing one or more of: (1) relieving the pressure on the first valve by first opening the second valve; (2) the first spring member and/or the pulling force of the outer armature; (3) the impact force of the distally moving outer armature; and (4) the increased pulling force of the coil on the outer armature as it is more centrally located in the bore, the valve assembly can open a relatively large valve member with a relatively small and inexpensive solenoid coil 40.

Figure 4:
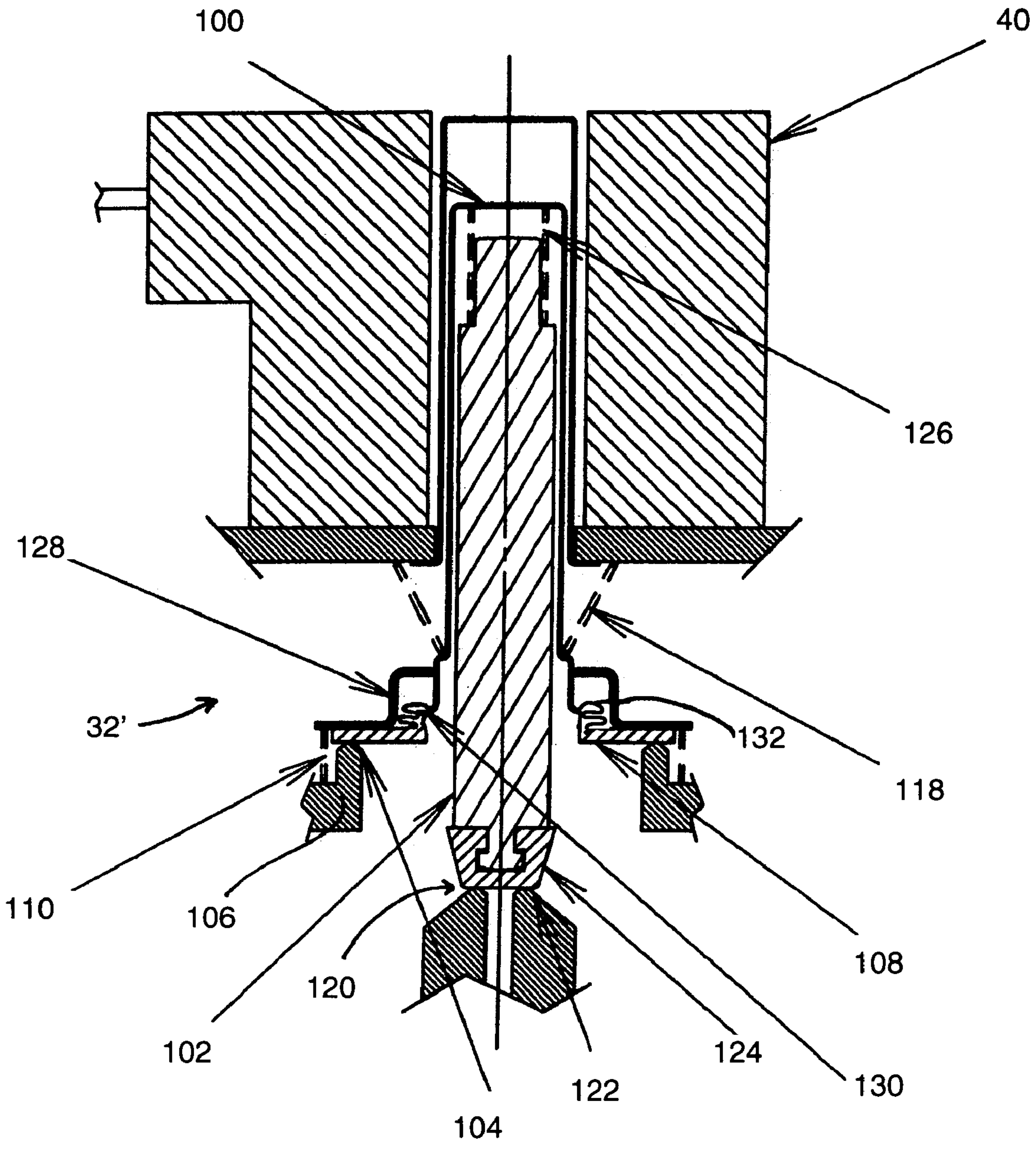
FIG. 4 is a enlarged cross-sectional view of a gas valve assembly of a second embodiment in the closed position.
Figure 5:
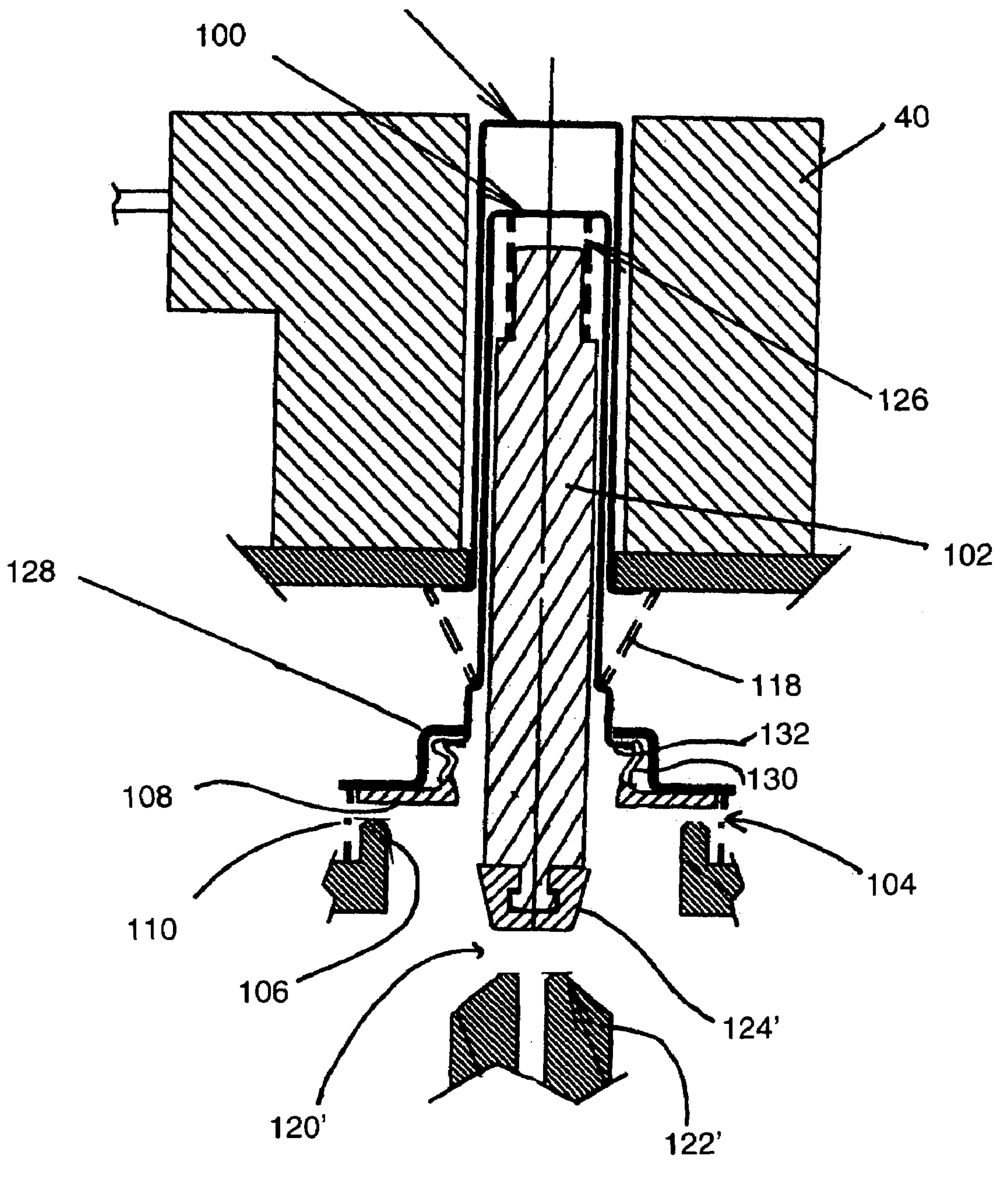
FIG. 5 is a enlarged cross-sectional view of a gas valve assembly of the second embodiment in the open position.

A second embodiment of a valve assembly is indicated generally as 32' in FIGS. 4 and 5. The valve assembly 32' is similar in construction to valve assembly 32, and corresponding parts are identified with corresponding reference numerals. The valve assembly 32' comprises the gas valve assembly includes an outer armature 100 axially movable proximally toward and distally away from the coil 40, parallel to the coil axis. An inner armature 102 is disposed inside the outer armature 100, and is axially movable proximally toward and distally away from the coil 40, parallel to the coil axis. The inner armature 102 is made from or includes a magnetically responsive material such that it is drawn proximally when the solenoid coil 40 is energized.

The gas valve assembly 32' also includes a first valve 104, having a first valve seat 106, that may be formed in or secured on the body of the gas valve 20. The first valve also includes a first valve member 108, which moves between a closed position (FIG. 4) in which the first valve member 108 abuts the first valve seat 106, and an open position in which the first valve member is spaced from the first valve seat. A first spring member resiliently biases the first valve member 108 to its open position. In this preferred embodiment the first spring member can be coil spring 110 surrounding the first valve seat and acting between the first valve seat 106 and the first valve member 108, although the spring member could be any other element capable of applying a force to the first valve member 108.

The gas valve assembly 32' also includes a flexible boot 130 which connects the first valve seat 106 with the distal end 132 of the outer armature 100. The distal end 132 of the outer armature 100 can engage a shoulder 128 on the first valve member 108 as described in more detail below. The distal end of 132 of the outer armature 100 is movable between a first distal position where it generally engages the first valve member 108, and a second proximal position where it engages the shoulder 128, and the flexible boot 130 accommodates this movement. A second spring member engages the outer armature 100 and resiliently biases the distal end 132 to its first position adjacent the first valve member 108. In this preferred embodiment, the second spring member is a coil spring 118 which engages the outer armature 100 and resiliently biases it in the distal direction.

The valve assembly 32' further comprises a second valve 120' (similar to the third valve 120), having a second valve seat 122' and a second valve member 124' on the inner armature 102. The second valve member 124' is movable with the inner armature 102 between a closed position in which the second valve member abuts the second valve seat 122', and an open position in which the second valve member is spaced from the second valve seat. A third spring member 126' engages the inner armature 102 and resiliently biases the second valve member carried thereon to its closed position.

Energizing the solenoid coil 40 causes the inner armature 102 to move proximally against the bias of the third spring member (e.g., spring 126), moving the second valve member 124' to its open position. This opens the passage 44. The movement of the inner armature 102 causes the outer armature 100 to move proximally against the bias of the second spring member (e.g., spring 118), moving the distal end 132 of the outer armature 100 to its second position engaging the shoulder 128 on the first valve member. The impact of the moving distal end 132 on the shoulder 128 helps to release the first valve member 108 from the first valve seat 106. The first valve member 108 can move proximally under the force applied by the distal end 132, which is relatively strong because the inner armature 102 is closer to its home position in the coil 40. The first valve member 108 can move under bias of the first spring member (e.g., spring 110), to its open position. The first spring member may be sufficient to open the first valve 104, however, instead of, or in addition to, the force from the first spring member, the outer armature 100 can engage the shoulder 128 with the distal end 114' of the outer armature 100.

As noted above the shoulder 128 is preferably spaced from the normal seated position of the distal end 132 against the first valve member 108, so that when the flange engages the shoulder, the flange is moving with the outer armature 100. This impact force contributes to the ability of the armature to opening the relatively larger first valve member. Further contributing to the ability of the armature to move the valve member is the fact that by the time the armature engages the first valve member, the armature has moved proximally into the bore of the coil where the pulling force of the coil is greater. Thus, by utilizing one or more of: (1) the first spring member and/or the pulling force of the outer armature; and (2) the impact force of the distally moving outer armature; and (3) the increased pulling force of the coil on the outer armature as it is more centrally located in the bore, the valve assembly can open a relatively large valve member with a relatively small and inexpensive solenoid coil 40.

OPERATION

When an appropriate AC voltage is supplied by a controller (such as a thermostat, which is not shown) and when manual switch 43 is in the "on" position, built-in rectifier circuitry (not shown) supplies rectified DC current to coil winding 40. The current through coil 40 generates a magnetic field that is concentrated and shaped by coil brackets 62 and sleeves 60 to provide an operating force on inner armature 102. This magnetic force is sufficient to override the third spring 126, which provides a biasing force on the inner armature 102 in an opposite direction to the magnetic field, which pulls inner armature into coil 40. Inner armature 102 slides within outer armature 100 (which may be non-magnetic) and moves towards the closed end of outer armature 100. This movement lifts the valve member 124 off its seat 122, thereby opening passage 44.

In the first embodiment, the outer armature 100 moves proximally with the inner armature 102, moving the valve member 116 from the valve seat 114 of the second valve 112. This relieves the pressure, so that spring 110 can move the first valve member 108 off of first valve seat 106. In addition, the flange 127 on the distal end of the outer armature 100 strikes and engages the shoulder 128 on the first valve member 108 to help move the first valve member off of the first valve seat 106 and open the first valve 104.

In the second embodiment, the outer armature 100 moves proximally with the inner armature 102. The flexible boot 132 accommodating the movement of the proximal end of the outer armature 100. By the time the moving end 132 of the outer armature 100 strikes the shoulder 128 of the first valve member 108, the impact helps move the first valve member off of the first valve seat 106. Continued pulling form the outer armature and the first spring 110 help open the first valve 104.

The pressure differential between the inlet and the outlet causes gas to flow through the open path 44 to the control gas orifice 46. The limited amount of gas coming through the control gas orifice 46 is split into two paths, one going to the servo diaphragm 64 and one going to the back of the regulator diaphragm 48. Pressure differential caused by the gas going to the back of the regulator diaphragm 48 forces the diaphragm to flex, pushing against a regulator shaft. This force overrides a regulator spring and the regulator shaft lifts a regulator valve off its seat, allowing high capacity regulated flow from the inner chamber 26 to outlet 24.

As long as appropriate current is supplied, the forces on the inner and outer armatures 100 and 102 remain in equilibrium and high capacity flow is allowed from inlet 22 to the inner chamber 26. Gas flow to outlet 24 is regulated by a balance of pressures. This balance is adjustable and controlled by the regulator 52. The regulator 52 controls the position of the regulator diaphragm 48, which in turn controls the position of the regulator valve. The position of this valve relative to its seat controls the flow of gas from inlet 22 to outlet 24. The effect of fluctuations in the inlet pressure within the specified range of operation are damped and effectively eliminated by this system. The inlet filter 28 and the outlet filter 30 prevent particles from entering the valve and interfering with proper operation.

When current to the valve coil 40 is interrupted, either by the controller (e.g., the thermostat interrupts AC voltage) or by turning off the manual switch 43, the magnetic field collapses. Breaking the force equilibrium that holds the valves off their seats (first valve 104 and third valve 120 in the first embodiment; first valve 104 and second valve 120' in the second embodiment), and the return springs 118 for the first valve and 126 for the third valve in the first embodiment, and 118 for the first valve and 126' for the second valve in the second embodiment. Closing redundancy is achieved by the independent closing of the two valves 104 and 120 in the first embodiment, and 104 and 120' in the second embodiment, the closing of either of which is separately capable of shutting off the gas flow. Valves 120 and 120' shut off the gas flow by closing against its seat 122. Valve 104 shuts of gas flow by closing off gas path 26.

It will thus be seen that the solenoid valve constructions of this invention having a single coil with co-axial armatures and a valve on each armature at the same side of the solenoid valve is useful to provide a redundant valve construction in a smaller space than previously known for structures having similar function. Two mechanically independent valves may be provided in a small space, both of which are supplied with an operating flux from a single coil. Those skilled in the art will recognize that the inventive solenoid valves of this invention may be useful in many applications and for control of many different types of fluids, and are especially useful for control of gaseous fuel flow. Inasmuch as many modifications within the spirit of the invention will be apparent to those skilled in the art, the scope of the invention should be determined by reference to the claims appended below and the full scope of equivalents as provided by applicable laws.

What is claimed:

1. A high capacity coaxial gas valve, comprising:

an electrically energizable solenoid coil having a coil axis;

an outer armature axially movable proximally toward and distally away from the coil, parallel to the coil axis;

an inner armature inside the outer armature, axially movable proximally toward and distally away from the coil, parallel to the coil axis, the inner armature being drawn proximally when the solenoid coil is energized;

a first valve, having a first valve seat and a first valve member, the first valve member movable between a closed position in which the first valve member abuts the first valve seat, and an open position in which the first valve member is spaced from the first valve seat;

a first spring member resiliently biasing the first valve member to its open position;

a second valve, having a second valve seat on the first valve member, and a second valve member formed on the outer armature, the second valve member movable with the outer armature between a closed position in which the second valve member abuts the second valve seat, and an open position in which the second valve member is spaced from the second valve seat;

a second spring member engaging the outer armature and resiliently biasing the second valve member carried thereon to its closed position;

a third valve, having a third valve seat and a third valve member on the inner armature, the third valve member movable with the inner armature between a closed position in which the third valve member abuts the third valve seat, and an open position in which the third valve member is spaced from the third valve seat;

a third spring member engaging the inner armature and resiliently biasing the third valve member carried thereon to its closed position, whereby energizing the solenoid coil causes the inner armature to move proximally against the bias of the third spring member, moving the third valve member to its open position, the movement of the inner armature causing the outer armature to move proximally against the bias of the second spring member, moving the second valve member to its open position, and allowing the first valve member to move under bias of the first spring member to its open position.

2. The valve according to claim 1 wherein the first spring member is a spring engaging the first valve member and the first valve seat.

3. The valve according to claim 1 wherein the second spring member is a spring acting on a shoulder on the outer armature to urge it in the distal direction.

4. The valve according to claim 1 wherein the outer armature has a closed distal end, and wherein the third spring member is a spring in the closed end of the outer armature.

5. The valve according to claim 1 further comprising a shoulder on the first valve member, and a flange on the outer armature adapted to engage the shoulder on the first valve member as the outer armature moves distally.

6. The valve according to claim 5 wherein the shoulder on the first valve member and the flange on the outer armature are positioned such that the coil force on the inner and outer armatures increases as the flange moves closer to the shoulder.

7. The valve according to claim 1 wherein the force of the first spring member is sufficient to open the first valve after the second valve is open.

8. The valve according to claim 1 wherein the force of the first spring member is insufficient to open the first valve after the second valve is open.

9. The valve according to claim 1 wherein third spring member is sufficient to urge the third valve member on the inner armature to engage the third valve seat, regardless of the position of the outer armature.

* * * * *